United States Patent
Gipson

(10) Patent No.: US 6,730,739 B2
(45) Date of Patent: May 4, 2004

(54) CLING FILM WITH ENHANCED POLYISOBUTYLENE TACKIFIER

(75) Inventor: Betty L. Gipson, Houston, TX (US)

(73) Assignee: Texas Petrochemicals LP, Houston, TX (US)

( * ) Notice: Subject to any disclaimer, the term of this patent is extended or adjusted under 35 U.S.C. 154(b) by 112 days.

(21) Appl. No.: 10/154,357

(22) Filed: May 23, 2002

(65) Prior Publication Data

US 2002/0197497 A1 Dec. 26, 2002

Related U.S. Application Data

(60) Provisional application No. 60/296,922, filed on Jun. 8, 2001.

(51) Int. Cl.$^7$ .......................... C08L 23/00; C08L 23/04; C08F 10/00; C08F 110/10
(52) U.S. Cl. ...................... 525/191; 525/240; 526/348.7
(58) Field of Search ................................ 525/191, 240; 526/348.7

(56) References Cited

U.S. PATENT DOCUMENTS

| | | |
|---|---|---|
| 3,849,085 A | 11/1974 | Knuez et al. |
| 4,231,759 A | 11/1980 | Udelhofen |
| 4,238,628 A | 12/1980 | Cahill et al. |
| 4,311,808 A | 1/1982 | Su |
| 4,605,808 A | 8/1986 | Samson |
| 5,068,490 A | 11/1991 | Eaton |
| 5,175,225 A | 12/1992 | Ruhe, Jr. |
| 5,192,335 A | 3/1993 | Cherpeck |
| 5,286,823 A | 2/1994 | Rath |
| 5,300,701 A | 4/1994 | Cherpeck |
| 5,408,018 A | 4/1995 | Rath |
| 5,910,550 A | 6/1999 | Rath |
| 5,962,604 A | 10/1999 | Rath |
| 6,132,827 A | 10/2000 | Miro |
| 6,361,856 B1 | 3/2002 | Wakai et al. |
| 6,361,875 B1 * | 3/2002 | Karaoglu et al. ........... 428/515 |
| 6,384,154 B1 | 5/2002 | Sigwart et al. |

FOREIGN PATENT DOCUMENTS

| | | |
|---|---|---|
| EP | 0 628 022 B1 | 11/1998 |
| GB | 1159368 | 7/1969 |
| WO | WO 94/14739 | 4/1994 |

* cited by examiner

*Primary Examiner*—Nathan M. Nutter
(74) *Attorney, Agent, or Firm*—Stinson Morrison Hecker LLP; James H. Marsh, Jr.

(57) ABSTRACT

An improved cling film includes a PIB tackifier that is essentially a homopolymer of isobutylene wherein the double bonds are mainly in the alpha position. A method for improving the cling properties of a cling film includes providing a cling film base structure and including in the base structure such a PIB tackifier.

56 Claims, 2 Drawing Sheets

CLING FILM WITH ENHANCED POLYISOBUTYLENE TACKIFIER

CROSS REFERENCE TO RELATED APPLICATION

Priority benefits under 35 U.S.C. § 119(e) are claimed in this application from copending provisional application Ser. No. 60/296,922 filed on Jun. 8, 2001, the entirety of the disclosure of which is hereby specifically incorporated herein by reference.

BACKGROUND OF THE INVENTION

1. Field of the Invention

The present invention relates to cling films and the like, and in particular to tackifiers for such films. More particularly the invention relates to improved polyolefin cling films which incorporate enhanced polyisobutylene (PIB) tackifiers. The invention also relates to methods for improving the cling characteristics of cling films by incorporating therein enhanced PIB tackifiers.

2. The Prior Art Background

Cling film is a well known product having many industrial uses including, for example, and without limitation, use as an over wrap for pallets and as a wrap for silage. The clinging properties of cling film are often improved and enhanced by the incorporation therein of a tackifier. Tackifiers are often incorporated into the cling film by adding the same to the melted resin during the production of the film.

Generally speaking, the base structure of a cling film may be any one of a number of polyolefin materials. For example, polypropylene may also be used as a cling film in high performance applications requiring an extra sturdy wrap. However, in common practical commercial usage, the base film usually comprises a polyethylene. There are several classes of polyethylene compositions which are suitable for such purposes, including high density polyethylene (HDPE), low density polyethylene (LDPE) and linear low density polyethylene (LLDPE).

One type of polyethylene that may be used to make cling film is a Dow Chemical LLDPE which incorporates an octene-1 comonomer. Other types of LLDPE which are often used in cling film applications include those made by Exxon, British Petroleum and the former Union Carbide (now merged with Dow). These LLDPE materials often incorporate comonomers such as butene-1 or hexene-1. In these materials, it is common for the base film to include from about 9 to about 11 weight percent of the comonomer.

As mentioned above, the clinging properties of cling film are often improved and enhanced by the incorporation therein of a tackifier. Conventionally, when the base film comprises LDPE or LLDPE, conventional polybutene is most often used as a tackifier. As with other known tackifiers, the conventional polybutene tackifier is simply added to the resin melt during the production of the cling film. Well known methods for producing films, and particularly cling films, include processes where the film is blown and processes where the film is extruded.

Conventional polybutene products of the sort which have previously been used as tackifiers for cling film are described, for example, in German patents nos. DE 19619267 dated Nov. 20, 1997 and DE 19520078 dated Dec. 12, 1996, and in U.S. Pat. Nos. 5,068,490 dated Nov. 26, 1991, 4,605,808 dated Aug. 12, 1986 and 5,286,823 dated Jun. 22, 1992. These prior patents are all directed to related subject matter. Generally speaking, these known polybutene products may range in number average molecular weight ($M_N$) from 500 to 1,000,000 or higher, and generally the same have a single double bond per molecule. The double bonds of these previously known polybutene materials are mostly internal. That is to say, it is normal for at least about 90% of the double bonds to be at an internal position and for less than about 10% of the double bonds to be in a terminal position. In addition, while the initial monomeric mixture used to produce these conventional polybutenes is predominantly isobutylene, the same usually incorporates substantial quantities of monomers other than isobutylene. Thus, the conventional polybutenes used as tackifiers may generally be referred to as copolymers or terpolymers. For example, conventional polybutenes often and commonly incorporate about 10% or so by weight of 1-butene and/or 2-butene, with only about 90% of the initial monomeric mix being isobutylene.

The polybutene tackifier is introduced into the resin melt in the film extruder or other apparatus used to produce the film and the same is therefore blended with the base polymer mix being used in the production of the film. When the polybutene tackifier is thus compounded into the blown or extruded films, it initially is randomly dispersed throughout the entire body of the produced film. Polybutene is generally incompatible with the materials used as the base structure of the film, and the same will therefore slowly migrate to the surface of the film where it is active in promoting the cling properties of the film because its inherent stickiness provides tack for the film. The migration of the polybutene to the surface of the film is referred to as blooming, and the rate at which migration to the surface occurs is referred to as the bloom rate. The amount of time required for this migration to occur so as to achieve optimum cling properties is known as bloom time.

As discussed above, conventional polybutene has been used in the past as a tackifier for plastic films. But such use has not been without it own set of problems. Current problems encountered when conventional polybutene is used in cling film applications include difficulty in handling due to the high viscosity of the polybutene material, inconsistent bloom rates due to the variability of the polybutene tackifier material, bloom times that are too long, smoking during heating and processing, high noise levels in machine wrap applications, condensation on air rings, and loss of polybutene during processing.

SUMMARY OF THE INVENTION

In accordance with the concepts and principles of the present invention a new and highly useful cling film tackifier is provided in the form of an enhanced PIB polymer product which is comprised essentially of a homopolymer of isobutylene wherein the double bonds are mainly in the alpha position. In further accordance with the preferred aspects of the invention, the PIB polymer product desirably may have a polydispersity no greater than about 2.2 and an $M_N$ that is within the inclusive range of from about 900 to about 3000.

Preferably, in farther accordance with the concepts and principles of the invention, at least about 95%, desirably at least about 97%, and ideally, at least about 99% of the monomeric units incorporated in the PIB polymeric tackifier molecules are isobutylene moieties. Even more desirably, no more than about 1% of the monomeric units incorporated in the PIB polymeric tackifier molecules are something other than isobutylene moieties.

In still further accord with the concepts and principles of the invention, at least about 40%, preferably at least about 50%, even more preferably at least about 60%, desirably at least about 70%, more desirably at least about 80%, even more desirably at least about 90%, and ideally more than 90% of the double bonds of the PIB polymeric tackifier product of the invention may be in the alpha position. In a most preferred form of the invention, no more than about 1% of the double bonds of the PIB polymer product are in a position other than alpha or beta.

The invention further provides an improved cling film comprising a PIB tackifier as outlined above. Broadly, the improved cling film of the invention may desirably have a polyolefin base structure. Ideally, the cling film of the invention may have a polyethylene base structure. Desirably, the cling film of the invention may include from about 1.5 to about 8.0% by weight of the PIB tackifier. Ideally, the cling film of the invention may include from about 3.0 to about 4.0% by weight of the PIB tackifier.

The invention also provides a method for improving the cling properties of a cling film which comprises including a PIB tackifier as outlined above in the cling film.

DETAILED DESCRIPTION OF THE PREFERRED EMBODIMENTS

Figure 1:
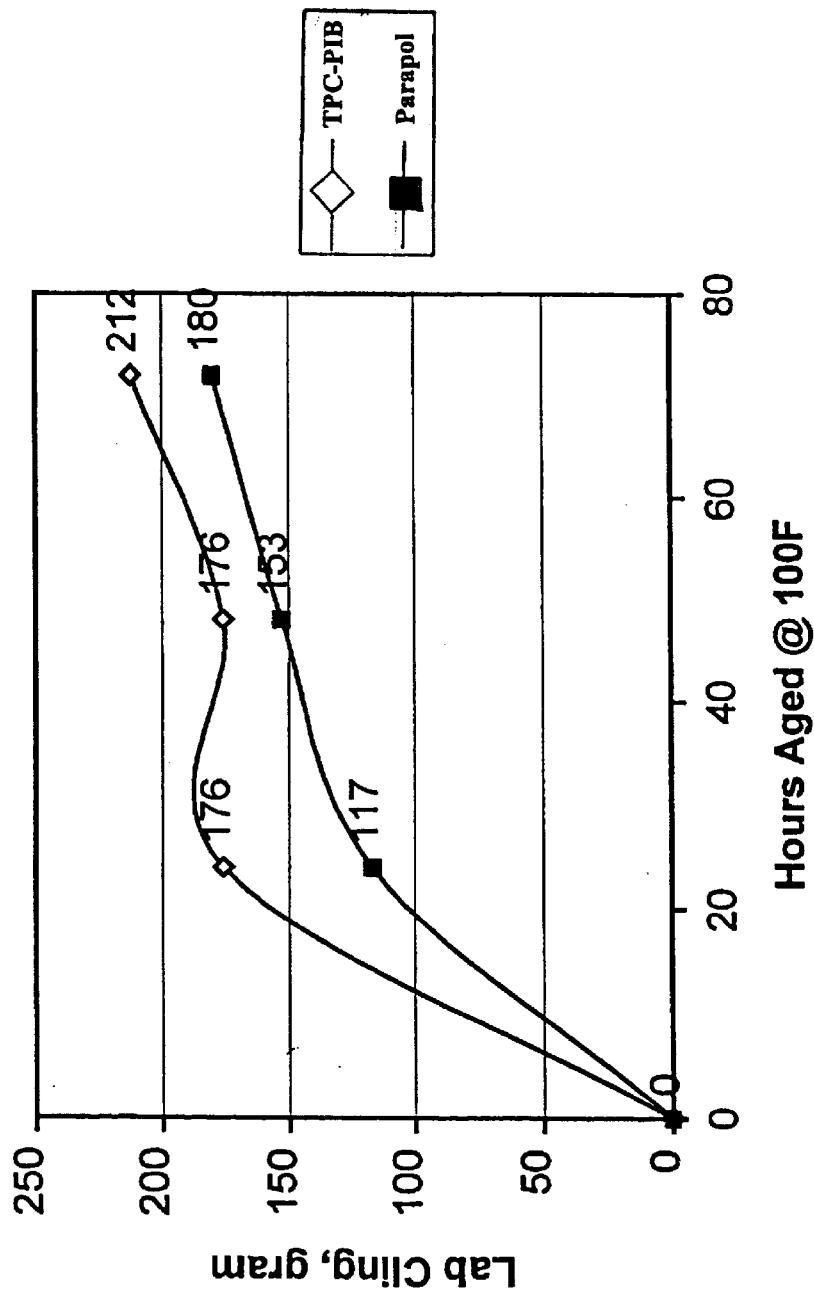
FIG. 1 is a chart comparing the cling properties of a cling film embodying the concepts and principles of the invention with the cling properties of a prior art cling film after aging at 100° F.

In accordance with the concepts and principles of the present invention, and as set forth above, it has been discovered that the problems encountered when conventional polybutene is used as a tackifier in olefin cling film applications may be alleviated, if not eliminated completely, by using, as a cling film tackifier, an enhanced PIB having a higher vinylidene (terminal double bond) content than conventional polybutenes and which is comprised essentially of a homopolymer of isobutylene with no more than about 5% incorporation of other $C_4$ isomers in the polymer. Such a tackifier has been found to be particularly valuable for tackifying cling films where the basic cling film structure comprises a polyolefin. Enhanced PIB materials suitable for use in connection with the present invention are described in several co-pending patent applications which are owned by the owner of the present application.

Patent application Ser. No. 09/515,790 filed on Feb. 29, 2000 and entitled "Process for Producing High Vinylidene Polyisobutylene" (the "'790 application") describes a new process for the production of enhanced polyisobutylene (PIB). Some grades of enhanced PIB are referred to as high vinylidene PIB (HV-PIB) which also may often be referred to as highly reactive PIB (HR-PIB). The terms HV-PIB and HR-PIB are essentially synonymous. The enhanced PIB may also sometimes be characterized by the term isobutylene homopolymer.

Patent application Ser. No. 09/665,084 filed on Sep. 20, 2000 and entitled "Process for Preparing Polyolefin Products" (the "'084 application") describes the use of the process of the '790 application for the production of polyolefins generally, including certain enhanced PIB polymer compositions. Patent application Ser. No. 10/102,279 filed Mar. 19, 2002 and entitled "Mid-Range Vinylidene Content Polyisobutylene Polymer Product and Process for Producing the same" (the "'279 application") describes certain mid-range vinylidene containing enhanced PIB polymer compositions. The entireties of the disclosures of the '790, the '084 and the '279 applications are hereby incorporated into and made a part of the present disclosure by this specific reference thereto.

The number average molecular weight ($M_N$) for the enhanced polyisobutylene to be used as a tackifier in accordance with the invention may desirably range from about 900 to about 3000. The alpha position double bond (vinylidene) content of the enhanced PIB product may desirably range from less than about 50% to more than about 90%, with the remainder of the double bonds ideally being in the beta position. Preferably, the polydispersity of the enhanced PIB product of the invention may range from about 1.2 to about 2.2, depending upon the molecular weight of the polyisobutylene. Desirably, the amount of isobutylene monomeric units incorporated in the enhanced PIB product for tackifier use should be at least about 95% and ideally may be about 99% or higher of the total monomeric moieties of the PIB product.

In accordance with the invention, the enhanced PIB to be used as a tackifier to provide the improved cling film of the invention may desirably and preferably be produced using the procedures described in the '790, the '084 and the '279 applications. Thus, a major and extremely important feature of the invention is simply that the enhanced PIB to be used as a tackifier to provide the improved cling film of the invention should desirably have a greater concentration of vinylidene double bonds, have a lower polydispersity, and have a higher percentage of isobutylene monomeric units than does conventional polybutene. Furthermore, the improved cling film product of the invention may desirably include from about 1.5 to about 8.0% by weight, and ideally may include from about 3.0 to about 4.0% by weight, of the enhanced PIB tackifier.

COMPARATIVE EXAMPLE

To establish the effectiveness of the enhanced PIB tackifier of the invention, a cling film was prepared from a Dow Chemical LLDPE containing an octene-1 comonomer. The polyethylene was polymerized using Dow metallocene catalyst technology. The density of the polyethylene was 0.92 g/cc and the melt flow range was between 1 and 2. A standard blown polyethylene film production line was used to produce both hand wrap and machine wrap films. Conventional polyethylene blown film production methodology was used to produce the film.

In accordance with the invention, the enhanced PIB used as the tackifier was produced employing the loop reactor described in the '790 application identified above. The catalyst consisted of a $BF_3$/methanol complex wherein the ratio of $BF_3$ to methanol was about 1:1. The reaction mixture was maintained at a temperature of from about 50 to about 60° F., and the residence time was about 120 seconds. The resultant PIB product had a number average molecular weight ($M_N$) of approximately 1600, an average alpha position double bond (vinylidene) content of about 60% and an average beta position double bond content of about 40%. That is to say, the PIB product contained about 100% alpha plus beta double bonds and essentially no tetra isomer. The polydispersity of the PIB product was about 1.4. At least about 99% of the monomeric units of the enhanced PIB product were isobutylene moieties.

The enhanced PIB tackifier product (TPC-PIB) described above was incorporated into a cling film using standard polyethylene blown film production methodology. The target tackifier concentration in the finished TPC-PIB product was approximately 3.1 weight percent. In an effort to accomplish this target tackifier concentration, a sufficient amount of the TPC-PIB tackifier was added to the polyethylene melt being fed to the film production machinery to provide a concentration of tackifier in the melt of approximately 3.2 weight percent. Using this melt, a polyethylene film bubble was blown using air and/or nitrogen so as to produce 18 inch rolls of a 67-gauge cling film. A standard blown polyethylene cling film production line was used to produce both hand wrap and machine wrap films.

For comparative purposes, a conventional prior art cling film was produced using essentially the same methodology, except that in this case Parapol 1300 (Exxon) was used as the tackifier. Parapol 1300 is a standard polybutene tackifier with low vinylidene (alpha position double bond) content (typically<10%). The $M_N$ of the Parapol 1300 was about 1600 and its polydispersity was in the range of 1.8 to 2.0.

Other properties and characteristics of the TPC-PIB and the Parapol 1300 tackifiers are shown and compared in Table 1 set forth below.

TABLE 1

Comparison of TPC-PIB with Parapol 1300 for Cling Film Applications

|  | TPC-PIB | Parapol 1300 |
|---|---|---|
| Color, APHA | 5 | 20 |
| Specific gravity, 60/60° F. | 0.90 | 0.90 |
| Viscosity, cSt |  |  |
| 40° C. | 18200 | 26600 |
| 70° C. | 2720 | 3370 |
| 100° C. | 636 | 640 |
| Viscosity Index | 191 | 177 |
| Flash point, COC, ° C. | 226 | 229 |
| Fire point, ° C. | 284 | 288 |
| Pour point, ° C. | 3 | 12 |
| Water, ppm | 17 | 34 |
| Acid number, mg KOH/g | <0.1 | <0.1 |
| Chlorine, ppm | <1 | 600 |
| Sulfur, ppm | <1 | <1 |
| Dissipation Factor, 100° C. | 0.0001 | 0.0001 |
| Power Factor, 100° C. | 0.0001 | 0.0001 |
| Dielectric breakdown voltage, KV | 53 | 44 |

The amount of polybutene in the extruded film was determined by FT-IR analysis which showed that approximately 3.3% of the TPC-PIB tackifier was present in the film of the invention, while only about 2.1% of the Parapol tackifier was found in the comparative prior art film. Thus, tackifier loss during the extrusion process is considerably less with the cling film produced with the TPC-PIB tackifier in accordance with the invention than with the cling film which incorporated the Parapol 1300 tackifier.

As can be seen from Table 1, at ambient temperatures, the TPC-PIB material is approximately half as viscous as conventional polybutenes. This results in easier handling and less heating is required to obtain viscosities low enough to handle with conventional pumps of the sort currently used for cling film production.

Figure 2:
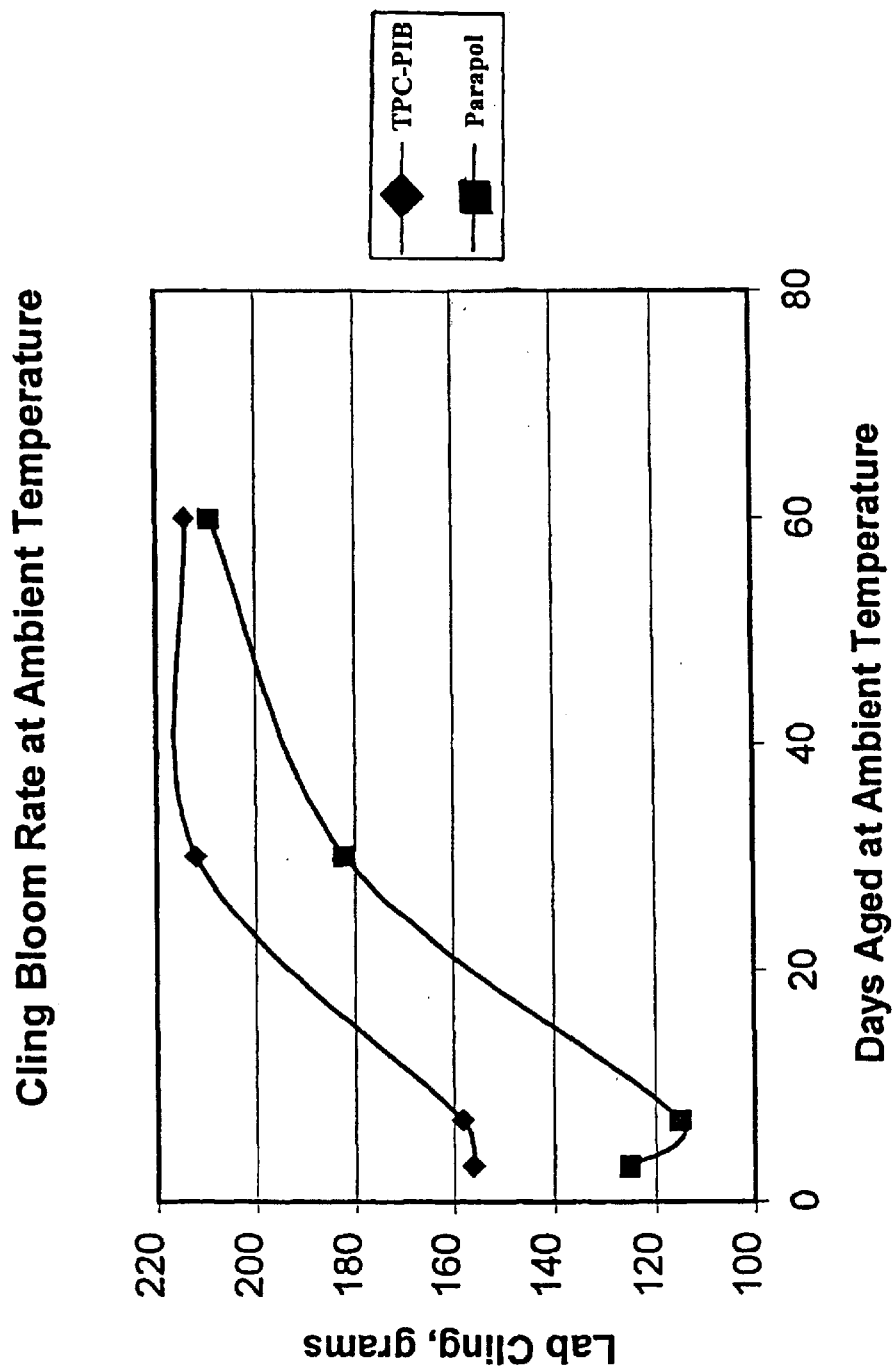
FIG. 2 is a chart comparing the cling bloom rate of a cling film embodying the concepts and principles of the invention with the cling properties of a prior art cling film after aging at room temperature.

Cling and bloom rate were tested over a three-day period at 100° F. and over a 60-day day period at ambient conditions. The resulting cling data as depicted in FIGS. 1 and 2 shows that under both hot room (100° F.) and ambient conditions, the TPC-PIB blooms faster and results in higher cling than the Parapol 1300. Based on a two month study, it has been determined that the bloom rate of films containing the TPC-PIB tackifier is such that the cling levels achieved after only 30 days under ambient conditions are significantly greater than the cling levels achieved in the prior art cling films employing Parapol 1300 as a tackifier after 60 days under ambient conditions.

Summarizing the foregoing, the enhanced PIB product used as a tackifier in accordance with the concepts and principles of the invention has improved end-use application for the production of polyethylene cling film due to the fact that the enhanced PIB product:

(1) provides faster bloom rates and higher cling levels;

(2) provides faster and more consistent bloom rates because of the narrow molecular weight distribution (low polydispersity) and the purity and consistency of the composition of the enhanced PIB;

(3) provides improved handling because of the lower viscosity at ambient conditions when compared to conventional polybutenes;

(4) is retained in the cling film during the extrusion process better than conventional polybutenes; and (5) does not significantly change unwind force and noise when compared with conventional polybutenes.

I claim:

1. An improved cling film comprising a PIB tackifier, wherein the PIB tackifier is comprised essentially of a homopolymer of isobutylene wherein the double bonds are mainly in the alpha position.

2. An improved cling film as set forth in claim 1, wherein said cling film further comprises a polyolefin base structure.

3. An improved cling film as set forth in claim 2, wherein said cling film comprises a polyethylene base structure.

4. An improved cling film as set forth in claim 1, wherein said PIB tackifier has a polydispersity no greater than about 2.2.

5. An improved cling film as set forth in claim 1, wherein said PIB tackifier has an $M_N$ no greater than about 3000.

6. An improved cling film as set forth in claim 5, wherein said PIB tackifier has an $M_N$ which is at least about 900.

7. An improved cling film as set forth in claim 1, wherein at least about 95% of the monomeric units incorporated in the PIB tackifier molecules are isobutylene moieties.

8. An improved cling film as set forth in claim 1, wherein at least about 97% of the monomeric units incorporated in the PIB tackifier molecules are isobutylene moieties.

9. An improved cling film as set forth in claim 1, wherein at least about 99% of the monomeric units incorporated in the PIB tackifier molecules are isobutylene moieties.

10. An improved cling film as set forth in claim 1, wherein no more than about 1% of the monomeric units incorporated in the PIB tackifier molecules are something other than isobutylene moieties.

11. An improved cling film as set forth in claim 1, wherein at least about 40% of the double bonds of the tackifier are in the alpha position.

12. An improved cling film as set forth in claim 1, wherein at least about 50% of the double bonds of the tackifier are in the alpha position.

13. An improved cling film as set forth in claim 1, wherein at least about 60% of the double bonds of the tackifier are in the alpha position.

14. An improved cling film as set forth in claim 1, wherein at least about 70% of the double bonds of the tackifier are in the alpha position.

15. An improved cling film as set forth in claim 1, wherein at least about 80% of the double bonds of the tackifier are in the alpha position.

16. An improved cling film as set forth in claim 1, wherein at least about 90% of the double bonds of the tackifier are in the alpha position.

17. An improved cling film as set forth in claim 1, wherein more than 90% of the double bonds of the tackifier are in the alpha position.

18. An improved cling film as set forth in claim 1, 11, 12, 13, 14, 15, 16 or 17, wherein no more than about 1% of the double bonds of the tackifier are in a position other than alpha or beta.

19. A PIB polymer product for use as a cling film tackifier, wherein the PIB polymer product is comprised essentially of a homopolymer of isobutylene wherein the double bonds are mainly in the alpha position.

20. A PIB polymer product as set forth in claim 19, wherein said PIB polymer product has a polydispersity no greater than about 2.2.

21. A PIB polymer product as set forth in claim 19, wherein said PIB polymer product has an $M_N$ no greater than about 3000.

22. A PIB polymer product as set forth in claim 21, wherein said PIB polymer product has an $M_N$ which is at least about 900.

23. A PIB polymer product as set forth in claim 19, wherein at least about 97% of the monomeric units incorporated in the PIB polymer product are isobutylene moieties.

24. A PIB polymer product as set forth in claim 19, wherein at least about 99% of the monomeric units incorporated in the PIB polymer product are isobutylene moieties.

25. A PIB polymer product as set forth in claim 19, wherein no more than about 1% of the monomeric units incorporated in the PIB polymer product are something other than isobutylene moieties.

26. A PIB polymer product as set forth in claim 19, wherein at least about 40% of the double bonds of the PIB polymer product are in the alpha position.

27. A PIB polymer product as set forth in claim 19, wherein at least about 50% of the double bonds of the PIB polymer product are in the alpha position.

28. A PIB polymer product as set forth in claim 19, wherein at least about 60% of the double bonds of the PIB polymer product are in the alpha position.

29. A PIB polymer product as set forth in claim 19, wherein at least about 70% of the double bonds of the PIB polymer product are in the alpha position.

30. A PIB polymer product as set forth in claim 19, wherein at least about 80% of the double bonds of the PIB polymer product are in the alpha position.

31. A PIB polymer product as set forth in claim 19, wherein at least about 90% of the double bonds of the PIB polymer product are in the alpha position.

32. A PIB polymer product as set forth in claim 19, wherein more than 90% of the double bonds of the PIB polymer product are in the alpha position.

33. A PIB polymer product as set forth in claim 19, 26, 27, 28, 29, 30, 31 or 32, wherein no more than about 1% of the double bonds of the PIB polymer product are in a position other than alpha or beta.

34. A method for improving the cling properties of a cling film comprising providing a cling film base structure and including in said base structure a PIB tackifier, wherein said PIB tackifier is comprised essentially of a homopolymer of isobutylene wherein the double bonds are mainly in the alpha position.

35. A method as set forth in claim 34, wherein said base structure comprises a polyolefin.

36. A method as set forth in claim 35, wherein said base structure comprises a polyethylene.

37. A method as set forth in claim 34, wherein said PIB tackifier has a polydispersity no greater than about 2.2.

38. A method as set forth in claim 34, wherein said PIB tackifier has an $M_N$ no greater than about 3000.

39. A method as set forth in claim 38, wherein said PIB tackifier has an $M_N$ which is at least about 900.

40. A method as set forth in claim 34, wherein at least about 92% of the monomeric units incorporated in the PIB tackifier molecules are isobutylene moieties.

41. A method as set forth in claim 34, wherein at least about 95% of the monomeric units incorporated in the PIB tackifier molecules are isobutylene moieties.

42. A method as set forth in claim 34, wherein at least about 99% of the monomeric units incorporated in the PIB tackifier molecules are isobutylene moieties.

43. A method as set forth in claim 34, wherein no more than about 1% of the monomeric units incorporated in the PIB tackifier molecules are something other than isobutylene moieties.

44. A method as set forth in claim 34, wherein at least about 40% of the double bonds of the tackifier are in the alpha position.

45. A method as set forth in claim 34, wherein at least about 50% of the double bonds of the tackifier are in the alpha position.

46. A method as set forth in claim 34, wherein at least about 60% of the double bonds of the tackifier are in the alpha position.

47. A method as set forth in claim 34, wherein at least about 70% of the double bonds of the tackifier are in the alpha position.

48. A method as set forth in claim 34, wherein at least about 80% of the double bonds of the tackifier are in the alpha position.

49. A method as set forth in claim 34, wherein at least about 90% of the double bonds of the tackifier are in the alpha position.

50. A method as set forth in claim 34, wherein more than 90% of the double bonds of the tackifier are in the alpha position.

51. A method as set forth in claim 34, 44, 45, 46, 47, 48, 49 or 50, wherein no more than about 1% of the double bonds of the tackifier are in a position other than the alpha or beta.

52. An improved cling film as set forth in claim 1, 2, 3, 6, 7, 10, 11, 12, 13, 14, 15, 16 or 17, wherein said film comprises from about 1.5 to about 8.0% by weight of said PIB tackifier.

53. An improved cling film as set forth in claim 52, wherein said film comprises from about 3.0 to about 4.0% by weight of said PIB tackifier.

54. A method as set forth in claim 34, 35, 36, 39, 40, 43, 44, 45, 46, 47, 48, 49 or 50, wherein from about 1.5 to about 8.0% by weight of said PIB tackifier is included in said cling film.

55. A method as set forth in claim 54, wherein from about 3.0 to about 4.0% by weight of said PIB tackifier is included in said cling film.

56. A PIB polymer product as set forth in claim 19, wherein at least about 95% of the monomeric units incorporated in the PIB polymer product are isobutylene moieties.

* * * * *